US011830036B1

(12) United States Patent
Harwood (10) Patent No.: US 11,830,036 B1
(45) Date of Patent: *Nov. 28, 2023

(54) SYSTEM AND METHOD FOR INVENTORY DISPLAY MANAGEMENT TOOL

(71) Applicant: WALGREEN CO., Deerfield, IL (US)

(72) Inventor: Jaclyn A. Harwood, Arlington Heights, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,050

(22) Filed: Nov. 29, 2022

Related U.S. Application Data

(63) Continuation of application No. 16/885,624, filed on May 28, 2020, now Pat. No. 11,521,235, which is a continuation of application No. 14/798,141, filed on Jul. 13, 2015, now Pat. No. 10,726,448.

(51) Int. Cl.
| G06Q 30/02 | (2023.01) |
| G06Q 10/08 | (2023.01) |
| G06Q 30/0251 | (2023.01) |
| G06Q 30/0202 | (2023.01) |

(52) U.S. Cl.
CPC ..... *G06Q 30/0259* (2013.01); *G06Q 30/0202* (2013.01); *G06Q 30/0264* (2013.01)

(58) Field of Classification Search
CPC .............................. G06Q 30/02; G06Q 10/08
USPC ....................................................... 705/7.31
See application file for complete search history.

(56) References Cited

U.S. PATENT DOCUMENTS

| 8,838,469 | B2* | 9/2014 | Bottom | G06Q 30/0204 |
| | | | | 705/7.29 |
| 10,726,448 | B1* | 7/2020 | Harwood | G06Q 30/0264 |
| 11,521,235 | B1* | 12/2022 | Harwood | G06Q 30/0202 |
| 2005/0197928 | A1 | 9/2005 | Fotteler et al. | |
| 2010/0138281 | A1* | 6/2010 | Zhang | G06Q 10/087 |
| | | | | 705/28 |
| 2010/0318403 | A1* | 12/2010 | Bottom | G06Q 30/0202 |
| | | | | 706/54 |
| 2012/0179507 | A1* | 7/2012 | McMains | G06Q 10/087 |
| | | | | 705/7.25 |
| 2013/0166468 | A1* | 6/2013 | Vogelgesang | G06Q 10/087 |
| | | | | 705/330 |
| 2015/0199627 | A1* | 7/2015 | Gould | G06Q 10/087 |
| | | | | 705/7.12 |

(Continued)

*Primary Examiner* — Nga B Nguyen
(74) *Attorney, Agent, or Firm* — MARSHALL, GERSTEIN & BORUN LLP; Randall G. Rueth (57) ABSTRACT

A method and system for allocating displays to a plurality of stores grouped into a plurality of store configurations is presented. It includes receiving a plurality of counts, that specifies spaces available in the store configuration for one of a plurality of types of displays, a ranking of a plurality of displays, wherein the ranking is based on a benefit of each of the plurality of displays for the store configuration, and when the plurality of displays are to be allocated to the plurality of stores; determining a subset of the plurality of displays that meet one or more conditions related to at least one of a forecasted sell through or forecasted margin of the plurality of displays for the store, allocating at least some of the displays based on the ranking of the displays, and generating an indication of the allocated displays for output to a user.

20 Claims, 10 Drawing Sheets

(56) References Cited

U.S. PATENT DOCUMENTS

2015/0324725 A1* 11/2015 Roesbery ........... G06Q 30/0639
  705/7.39
2015/0379906 A1   12/2015 Brooks et al.
2016/0335586 A1   11/2016 Panchamgam

* cited by examiner

*Shows 1 if Store Qualifies for Display based on Sell Through & Space*

|  |  |  |  |  |  | Store Counts | 3,573 | 5,626 | 5,413 | 4,934 | 4,773 | 6,249 | 6,072 |
|---|---|---|---|---|---|---|---|---|---|---|---|---|---|
| GMM Name | Store Format | Store Number | City | State | Promo Location Type | Promo Location Count | $2 Personal Care | BIC | Crest | Disney Princess | Dove | Mayb New | Pantene |
|  |  |  |  |  |  |  | Displays | | | | | | |
| Curtin | Prototype 1 | 13 | GUAYNABC | PR | ENDSTANC | 13 | 1 | 1 | 1 | 1 | 1 | 1 | 1 |

FIG. 7A — 702

*Ranks Displays by Sell Through for Each Store & Each Display Type*

|  |  |  |  |  |  | | $2 Personal Care | BIC | Crest | Disney Princess | Dove | Mayb New | Pantene |
|---|---|---|---|---|---|---|---|---|---|---|---|---|---|
| GMM Name | Store Format | Store Number | City | State | Promo Location Type | Promo Location Count | | | | Displays | | | |
| Curtin | Prototype 1 | 13 | GUAYNABC | PR | ENDSTANC | 13 | 80% | 87% | 93% | 101% | 94% | 98% | 98% |

FIG. 7B — 704

*Summary by Displays Item# (Also Available by Store)* ← 706

| Display WIC | Count of Component WICS | Total Projected Pieces Sold | Total Qty | Avg Display Sell Through | Count of Stores with Threshold | Total Count of Stores Forecasted |
|---|---|---|---|---|---|---|
| $2 Personal Care | 21 | 79 | 156 | 50% | 3,691 | 7,886 |
| BIC | 27 | 64 | 106 | 61% | 5,682 | 7,884 |

FIG. 7C

*Shows Summary by Component Item# which can be used for Tiering (Also Available by Store)* ← 708

| Display Name | Display WIC | Component WIC | Stores Over Threshold | Total Stores | Display Quantity | Average of Item Location Sell Through |
|---|---|---|---|---|---|---|
| $2 Personal Care | 303843 | 146245 | 7,348 | 7,539 | 2 | 97% |
| $2 Personal Care | 303843 | 226516 | 4,447 | 4,613 | 2 | 96% |

SYSTEM AND METHOD FOR INVENTORY DISPLAY MANAGEMENT TOOL

CROSS-REFERENCE TO RELATED APPLICATIONS

The present application is a continuation of U.S. patent application Ser. No. 16/885,624 entitled "SYSTEM AND METHOD FOR INVENTORY DISPLAY MANAGEMENT TOOL" and filed on May 28, 2020; which is a continuation of U.S. patent application Ser. No. 14/798,141 entitled "SYSTEM AND METHOD FOR INVENTORY DISPLAY MANAGEMENT TOOL" and filed on Jul. 13, 2015, the disclosures of which are hereby incorporated by reference herein in their entirety.

TECHNICAL FIELD

This disclosure relates generally to allocating and managing displays within a retail space and, in particular, to near optimally allocating multiple types of available displays to a plurality of stores.

BACKGROUND

Currently, retail displays that house promotional items, such as branded end cap or end stand displays, free-standing promotional displays, pallets, etc., are allocated to retail stores using methods that require significant manual interaction or configuration. That is, employees of a retail company must manually evaluate proposed displays, determine which displays to allocate to stores, determine which stores are to receive certain types of displays, etc. This process itself is time intensive and costly. However, in addition, this type of manual allocation frequently produces non-ideal solutions in that the displays are allocated to stores that cannot sell through the promotional items housed in the displays or that do not have available spaces for the displays. Displays are costly and bulky and, thus, a non-ideal allocation of display can result is significant financial losses.

Some retailers may attempt to solve this problem by grouping stores into categories and allocating displays via the categories. For example, retailers may allocate certain displays to stores having a known store configuration or layout, to segmented departments of a store, etc. However, this type of allocation may still result in allocations to stores that cannot sell through the promotional items housed in the displays or that do not have available spaces for the displays. Moreover, this type of allocation does not take in account any overall profit, sell through, or margin resulting from the allocation of displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for allocating displays to a plurality of stores grouped into a plurality of store configurations may be provided. The method may include receiving, via at least one of a user interface or a network interface, information specifying: (i) for each of the plurality of store configurations, a plurality of counts, wherein each of the plurality of counts specifies a number of spaces available in the store configuration for one of a plurality of types of displays, (ii) for each of the plurality of store configurations, a ranking of a plurality of displays for each of the plurality of types of displays, wherein the ranking of the plurality of displays is based on a benefit of each of the plurality of displays for the store configuration, and (iii) a period of time in the future when the plurality of displays are to be allocated to the plurality of stores; for each of the plurality of stores in each of the plurality of store configurations: determining, by a benefit analysis module, for each of the plurality of types of displays, a subset of the plurality of displays that meet one or more conditions related to at least one of a forecasted sell through or forecasted margin of the plurality of displays for the store during the period of time, allocating, by a per store allocation module, at least some of the subset of the plurality of displays to the store based on the ranking of the plurality of displays for the corresponding store configuration, and generating, by an allocation output module, an indication of the allocated at least some of the subset of the plurality of displays for output to a user.

In another embodiment, a system includes one or more processors; and one or more non-transitory memories, wherein the one or more non-transitory memories store computer-readable instructions that specially configure the system such that, when executed by the one or more processors, the one or more non-transitory memories cause the system to: receive, via at least one of a user interface or a network interface, information specifying: (i) for each of a plurality of stores, a plurality of counts, wherein each of the plurality of counts specifies a number of spaces available in the store for one of a plurality of types of displays, (ii) for each of the plurality of stores, a ranking of a plurality of displays for each of the plurality of types of displays, wherein the ranking of the plurality of displays is based on a benefit of each of the plurality of displays for the store, and (iii) a period of time in the future when the plurality of displays are to be allocated to the plurality of stores; for each of the plurality of stores: determine, for each of the plurality of types of displays, a subset of the plurality of displays that meet one or more conditions related to at least one of a forecasted sell through or forecasted margin of the plurality of displays for the store during the period of time, allocate at least some of the subset of the plurality of displays to the store based on the ranking of the plurality of displays, and generate an indication of the allocated at least some of the subset of the plurality of displays for output to a user.

In another embodiment a specially configured computing device for allocating at least some of a plurality of displays to a plurality of stores is provided. The specially configured computing device may include a data access mechanism configuring the specially configured computing device to access information specifying: (i) for each of a plurality of stores, a plurality of counts, wherein each of the plurality of counts specifies a number of spaces available in the store for one of a plurality of types of displays, (ii) for each of the plurality of stores, a ranking of a plurality of displays for each of the plurality of types of displays, wherein the ranking of the plurality of displays is based on a benefit of each of the plurality of displays for the store, and (iii) for each of a plurality of stores, at least one of the forecasted sell through or the forecasted margin of each of the plurality of displays for a period of time in the future when the plurality of displays are to be allocated to the plurality of stores; a data storage and communication mechanism configuring the specially configured computing device to at least one of: store, on a computer-readable medium, for each of the plurality of stores, an indication of a subset of the displays allocated to the store for the period of time in the future, or communicate, to a remote computing device, for each of the plurality of stores, the indication of the subset of the displays allocated to the store for the period of time in the future; and a display allocation engine configuring the specially configured computing device to, for each of the plurality of stores: determine, for each of the plurality of types of displays, ones of the plurality of displays that meet one or more conditions related to at least one of the forecasted sell through or the forecasted margin of the plurality of displays for the store during the period of time, allocate the subset of the plurality of displays to the store based on the ranking of the plurality of displays and the determined ones of the plurality of displays, and generate the indication of the subset of the plurality of displays.

DETAILED DESCRIPTION

In the embodiments described below, a display allocator automatically allocates displays, such as free-standing shelves, branded portions of a shelf, pallets, etc., housing retail items (cosmetics, food, medicine, etc.) to a plurality of retail stores such that a benefit (profit, sell-through, margin, etc.) is near maximized for each store or for the combination of stores. An input data set for the display allocator may include data specifying: (i) for each of the stores, a plurality of counts, wherein each of the plurality of counts specifies a number of spaces available in the store for one of a plurality of types of displays, and (ii) for each of the plurality of stores, a ranking of a plurality of displays (to be allocated) for each of the plurality of types of displays. The ranking of the displays may be based on a forecasted sell through and/or forecasted margin for each of the displays.

In some implementations, the display allocator may utilize one or more sell through and/or margin thresholds to only allocate displays to stores having a forecasted sell through and/or margin for the displays at or above the thresholds. In this manner, the display allocator may ensure that stores are not allocated more inventory than they can sell within a period of time (a week, month, etc.) and may allocate displays to a combination of stores that will near maximize or otherwise optimize an overall profit, sell through, or margin. Such an analysis may also identify certain displays that will not perform well (i.e., result in a certain sell through or margin) in any of the stores to which displays are to be allocated.

As referred to herein, the term "display" may refer to any number of components utilized within retail spaces to house/hold products and/or to display advertisements. Displays may include, by way of example, include shelving units, pallets, free-standing displays, foldable displays, tables, displays to be coupled to the end of shelving units (or "end caps"), displays to be coupled to the corners of shelving units, displays that hook or otherwise latch onto shelving units, rotatable displays, etc. Various examples of displays are depicted in FIGS. 3A, 3B, and 3C.

Figure 1:
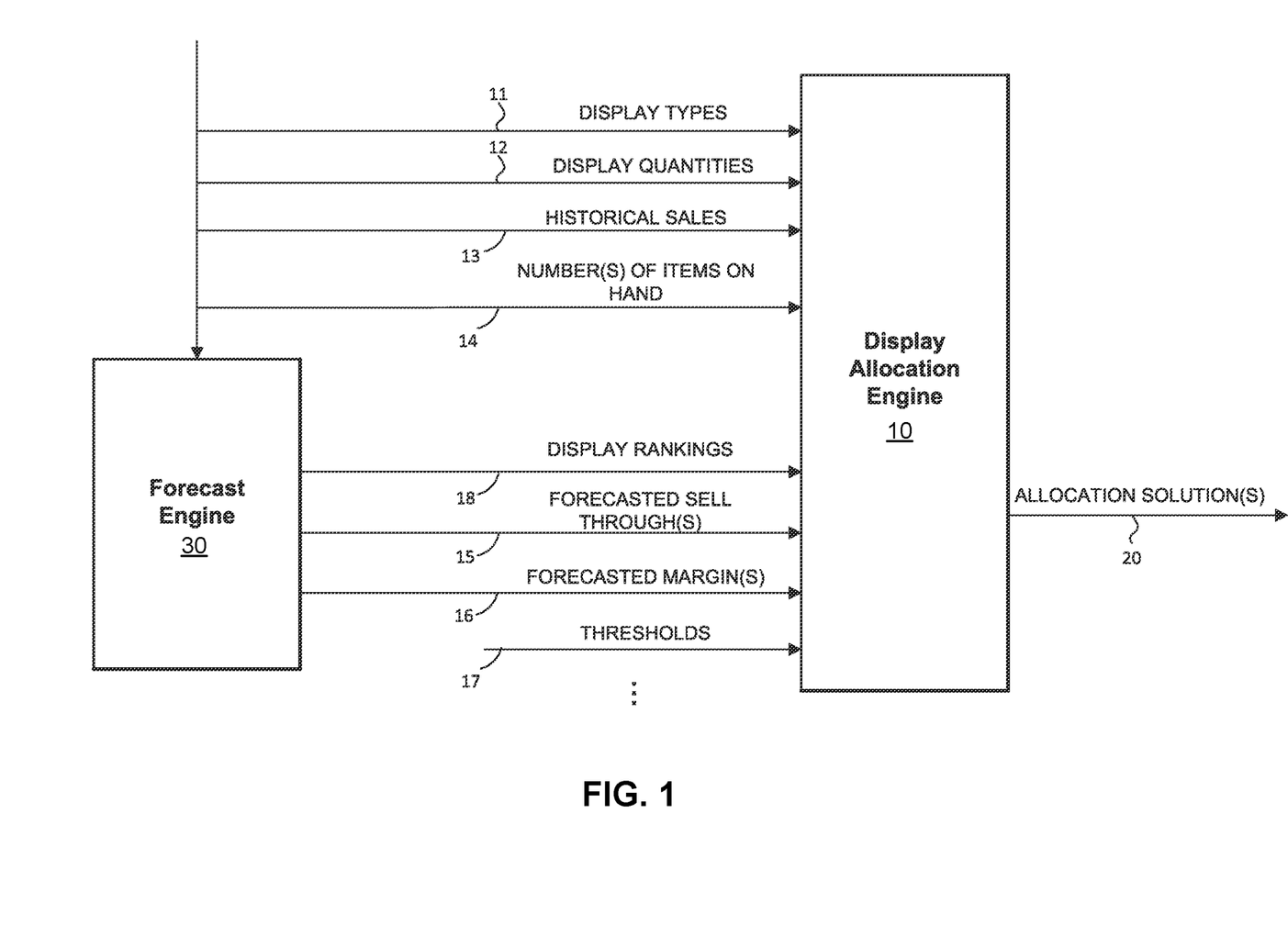
FIG. 1 illustrates an example flow of data into a display allocation engine to produce allocation solutions.

Referring to FIG. 1, an example display allocation engine 10 (or "display allocator") receives display types 11, display quantities 12, historical sales data 13, number(s) of items on hand 14 for a plurality of stores, and thresholds 17. The example display allocation engine 10 may also receive, from a forecast engine 30, forecasted sell through(s) 15, forecasted margin(s) 16, and rankings of displays 18. Using the data 11-18, the display allocation engine 10 generates one or more allocation solution 20 that may specify combinations of stores and corresponding displays allocated to those stores. To generate the allocation solutions 20, the display allocation engine 10 may allocate displays to certain stores based on the rankings of displays, portions of the data 11-18, and/or quantities derivable from the data 11-18, such that the allocated displays correspond to a near optimal allocation of displays with regard to sell through(s), profits, or margin(s).

Figure 2:
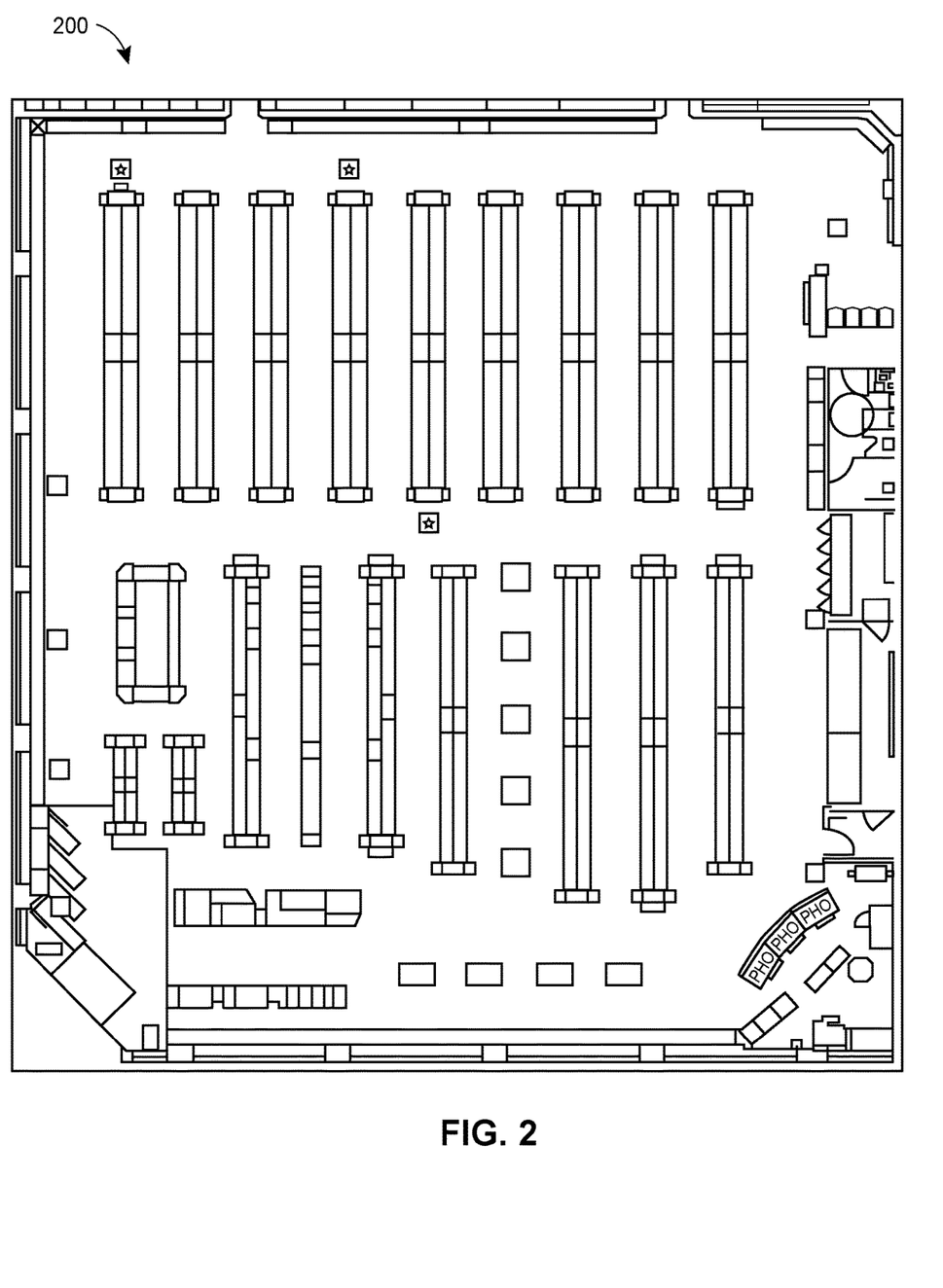
FIG. 2 is a schematic illustrating an example layout of a retail store.

More specifically, the display types 11 may specify various types of displays available for allocation in a plurality of stores. That is, a retailer may group a plurality of displays into certain types or categories of displays based on size, shape, construction, placement within a store, etc., and the display types 11 may represent these types or categories. FIG. 2 is a schematic of an example retail space 200 of a store, where the display allocation engine 10 may allocate displays to the store to be placed in the retail space 200. The display types 11 may specify, in an implementation, categories of displays based on where the displays are to be positioned within the retail space 200. For example, one type of display indicated in the display types may be an "end cap" or "end stand" type of display to be positioned at the end of various shelving units within the retail space 200. In another example, a type of display indicated in the display types may be a "pallet" type of display to be positioned in the aisles or other open spaces of the retail space 200.

Figure 3A:
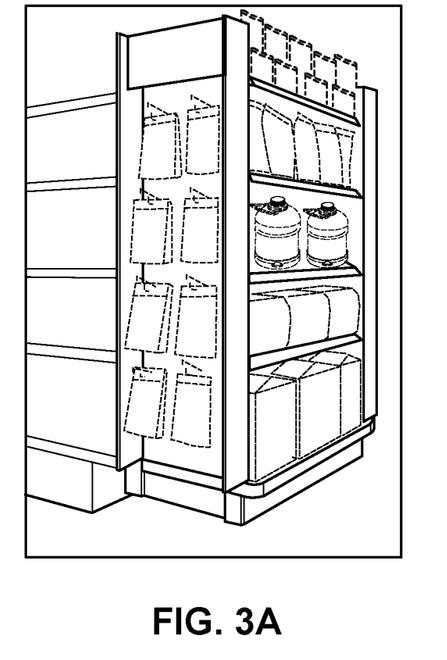
FIGS. 3A, 3B, and 3C illustrate example displays, which display may be allocated by the display allocation engine depicted in FIG. 1.
Figure 3B:
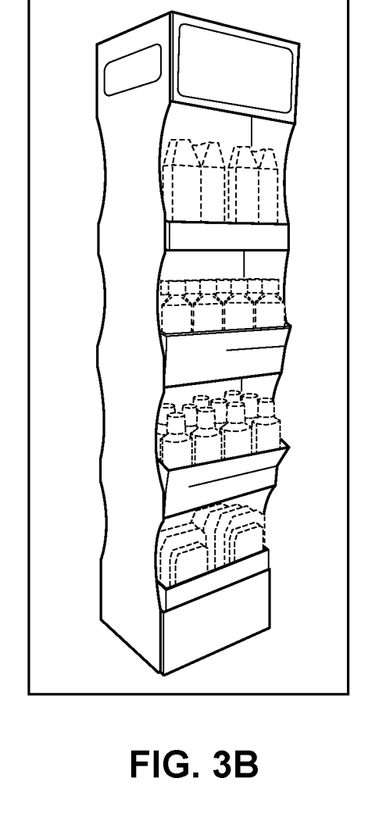
Figure 3C:
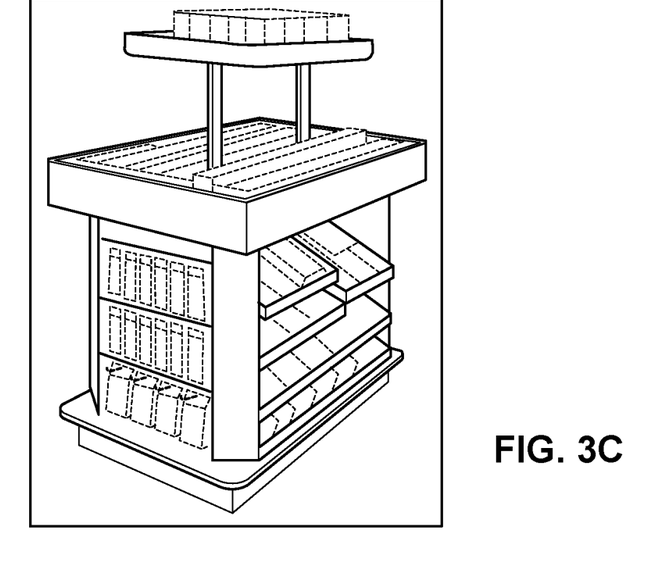

FIGS. 3A, 3B, and 3C depict example types of displays that could be allocated by the display allocation engine 10. Although FIGS. 3A, 3B, and 3C illustrate certain displays and certain types of displays ("end caps," "pallets," etc.) will be referred to herein, display allocation engines, such as the display allocation engine 10 may allocate any suitable types and numbers of displays different from those depicted in FIGS. 3A, 3B, and 3C.

The display quantities 12 may indicate, for each of a plurality of stores or a plurality of store configurations, counts for the various available types of displays indicated by the display types 11. These counts may correspond to available spaces within the respective store or store configuration where displays, of the corresponding display type, may be placed. For example, for the retail space 200, the display quantities 12 may indicate that the retail space has a first number of spaces for end cap displays, a second number of spaces for pallet displays, a third number of spaces for corner displays, etc.

The display quantities 12 may, in some implementations, indicate counts for each store location to which displays are to allocated. In other implementations, individual store locations for a certain retailer may be grouped into a plurality of store configurations, and the display quantities 12 may indicate counts for each store configuration. For example, individual stores of a retailer may be grouped according to common store layouts or blueprints utilized by the retailer, such as the store layout illustrated in FIG. 2.

Figure 4:
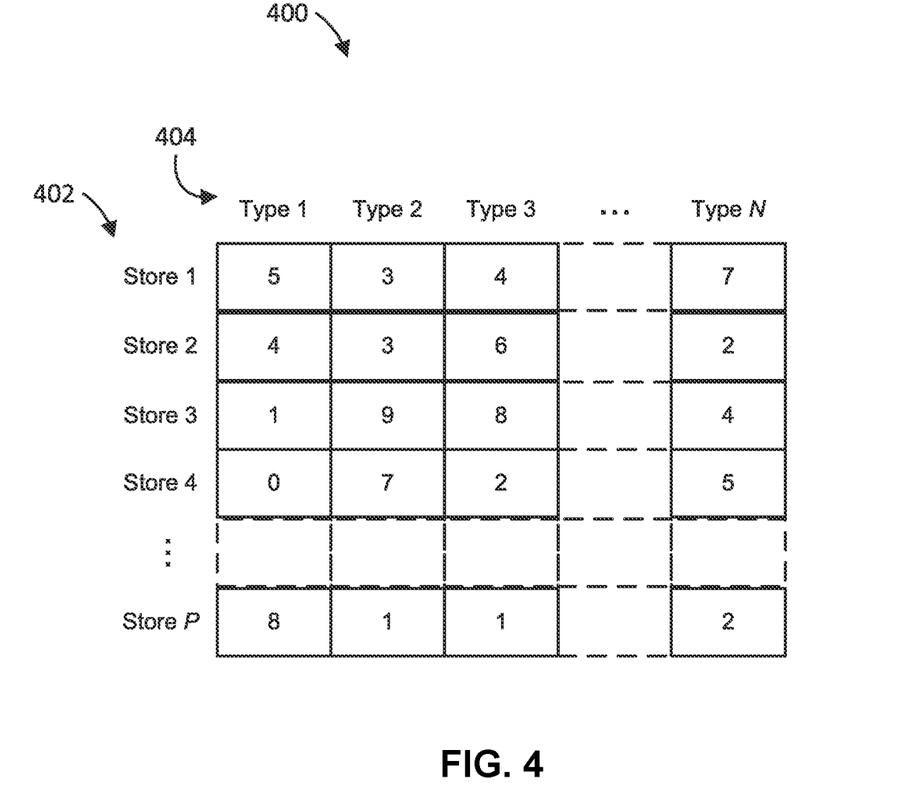
FIG. 4 illustrates example counts of available spaces within stores or store configurations.

FIG. 4 illustrates example display quantity data 400, which data may be input to the display allocator 10 as the display quantities 12. The display quantity data 400 may, for each of a plurality of stores 402 (or store configurations) and for each of a plurality of types of displays 404, indicate a count of available spaces. Although the display quantity data 400 is illustrated as a table in FIG. 4, display quantities or counts may be represented in any suitable format when input to a display allocator, such as a matrix, array, list, document (e.g., JSON document), proprietary spreadsheet document, etc.

Returning to FIG. 1, the historical sales data 13 may indicate historical sales (e.g., sales occurring at previous times) of items housed in a plurality of displayed to be allocated to stores, such as the plurality of displays indicated by the display types 11 and display quantities 12. That is, for each of the items (e.g., products) housed within each of a plurality of displays to be allocated to stores, the historical sales data 13 may indicate how many of that item have sold in the past (e.g., in a past day, month, year, etc.), profits resulting from the sale of that item in the past, etc. This historical sales data 13 may be representative of historical quantities, sell throughs, profits, margins, or other sales metrics for the items in one or many past time periods.

The number of items on sale 14 may indicate, for each item housed in the displays to be allocated to a plurality of stores, a count of the item. The count may indicate the number of items currently in stock at all stores and/or for each individual store, for example. Using this information, the display allocation engine 10 may ensure that certain displays are only allocated to stores capable of selling through a certain percentage or quantity of items. In other words, if a store has many of a certain item in stock, the display allocation engine 10 may not allocate displays to that store, where the displays house more of the certain item. Such a near optimal allocation prevents stores from accumulating quantities of products that the stores are unable to sell through (at least up to a certain percentage).

In some implementations, both the display allocation engine 10 and the forecast engine 30 may receive the data 11-14. The display allocation engine 10 may utilize portions of the data 11-14 in allocating displays to stores. However, the display allocation engine 10 may also utilize quantities derived from the data 11-14 by the forecast engine 30. Specifically, the forecast engine 30 may generate the display rankings 18, the forecasted sell throughs 15, and/or the forecasted margins 16 from the data 11-14, and the forecast engine 30 may transfer the display rankings 18, the forecasted sell throughs 15, and/or the forecasted margins 16 to the display allocation engine 10 as further input. The display allocation engine 10 may utilize a suitable combination of the data 11-14 and the data 15, 16, and 18 to allocate displays to stores in a near optimal manner.

Figure 5:
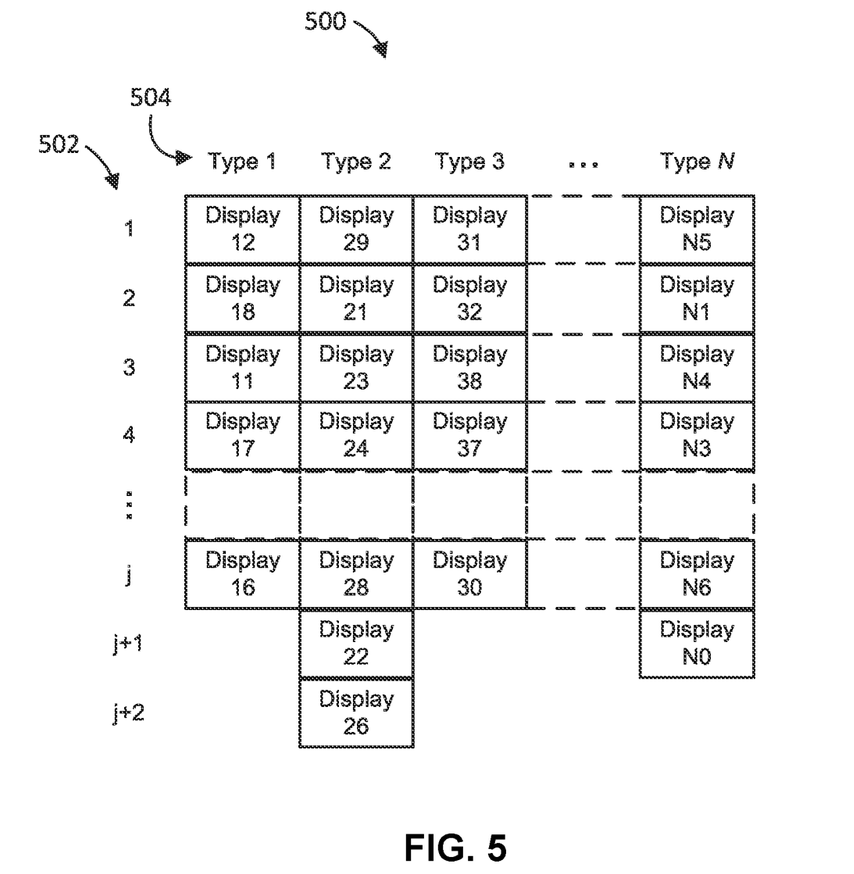
FIG. 5 illustrates example rankings of displays, which ranking may be utilized by the display allocation engine depicted in FIG. 1.

The display ranking 18 may indicate, for each of a plurality of stores and/or for each of a plurality of store configurations, one or more rankings of displays. For example, the rankings of displays may indicate a ranking of displays available for allocation by display type. FIG. 5 illustrates an example display ranking 500 that may be input to the display allocation engine 10 and, at least in some implementations, generated by the forecast engine 30. The display ranking 500 includes, for each of a plurality of display types 504, a ranking of displays. The ranking for each of the display types 504 may include a different number (as indicated by an index 502) of available displayed arranged in an order, because, for a certain period in time, different numbers of each display type may be available for allocation. Each display in the display ranking 500 may correspond to one of the displays to be allocated to a plurality of stores, and each display may be indicated by a unique identifier, such as a number, code, name, etc.

The forecast engine 30 may order or arrange the displays in the display ranking based on the historical sales data 13, various pre-programmed or dynamically generated forecasting models, and/or based on any other suitable pre-determine or otherwise determined methods. For example, the forecast engine 30 may implement one or more models, such as time series (ARMA, ARIMA, etc.) models, to predict, for each display a sell through, margin, or profit. The forecast engine 30 may then rank the display in the display ranking 500 according to these forecasted quantities. Generally, the forecast engine 30 may utilize time series, regression, machine learning (decision trees, neural networks, support vector machines, random forests, etc.), or other suitable algorithms to predict suitable benefits, such as profits, for each display and rank displays into the display ranking 500.

In some implementations, the forecast engine 30 may generate a display ranking, such as the display ranking 500, for each individual store operated by a retailer based on historical sales data for that store. In other implementations, the forecast engine 30 may generate a display ranking for each store configuration into which individual stores are categorized. Thus, the forecast engine 30 may provide multiple display ranking, for each store or for each store configuration, to the display allocation engine 10 as input.

The forecast engine 30 may also provide the forecasted sell throughs 15 and forecasted margins 16, utilized in the ranking of displays, to the display allocation engine 10 as input. The forecasted sell throughs 15 and forecasted margins 16 may include forecasted sell throughs 15 and the forecasted margins 16 for each item housed in a plurality of displays and/or for each of a plurality of displays. That is, the display allocation engine 10 may utilize both forecasted sell throughs and margins for individual items (e.g., housed in displays) and may utilize collective forecasted sell throughs and margins for each display. Forecasted sell throughs and forecasted margins for individual items may, in some implementations, be combined (e.g., with a weighted average) to produce forecasted sell throughs and forecasted margins for displays housing multiple items or housing multiple of one item.

Although one forecast engine 30 is depicted as providing the data 15, 16, and 18 to the display allocation engine 10, some implementations may include multiple forecast engines providing input to the display allocation engine 10. Further, the display allocation engine 10 may, in some implementations, query one or more database stored on one or more data storage devices (not shown) to obtain forecasted sell throughs, forecasted margins, display ranking, or other suitable forecasted or predicted quantities. Generally, the display allocation engine 10 may obtain inputs from any suitable combination of computing device and data storage devices.

In some implementations, the display allocation engine 10 may also receive the thresholds 17 as input. The thresholds 17 may include numbers, formulas, equalities, inequalities, logical expressions, etc. that define one or more conditions utilized in the allocation of displays to a plurality of stores. For example, one threshold may be a number, where the display allocation engine 10 utilizes the number to determine if a forecasted sell through or margin for a certain display at a certain store (or store configuration) is at or above the number. In this manner, the display allocation engine 10 may only allocate displays to stores capable of selling a certain percentage of items housed in the display or to stores capable of obtaining a certain profit or margin when utilizing the display. In other examples, the thresholds 17 may include thresholds defining conditions related to how many displays are to be allocated to certain geographic areas, how many displays are to be allocated to any one store, how many items housed in displays are to be distributed to a store, how often displays are to be allocated to a store, etc.

Although FIG. 1 illustrates various types of data 11-18 input to the example display allocation engine 10, inputs to a display allocation engine may include any number of separate types of data and/or formats of data. For example, the input to the display allocation engine 10 may be contained in a single data file with any suitable number of indices, labels, headers, etc. allowing the display allocation engine 10 to parse the single data file. In other example, various types of data may be provided to the display allocation engine 10 in multiple different data files having the same of different formats.

Figure 6:
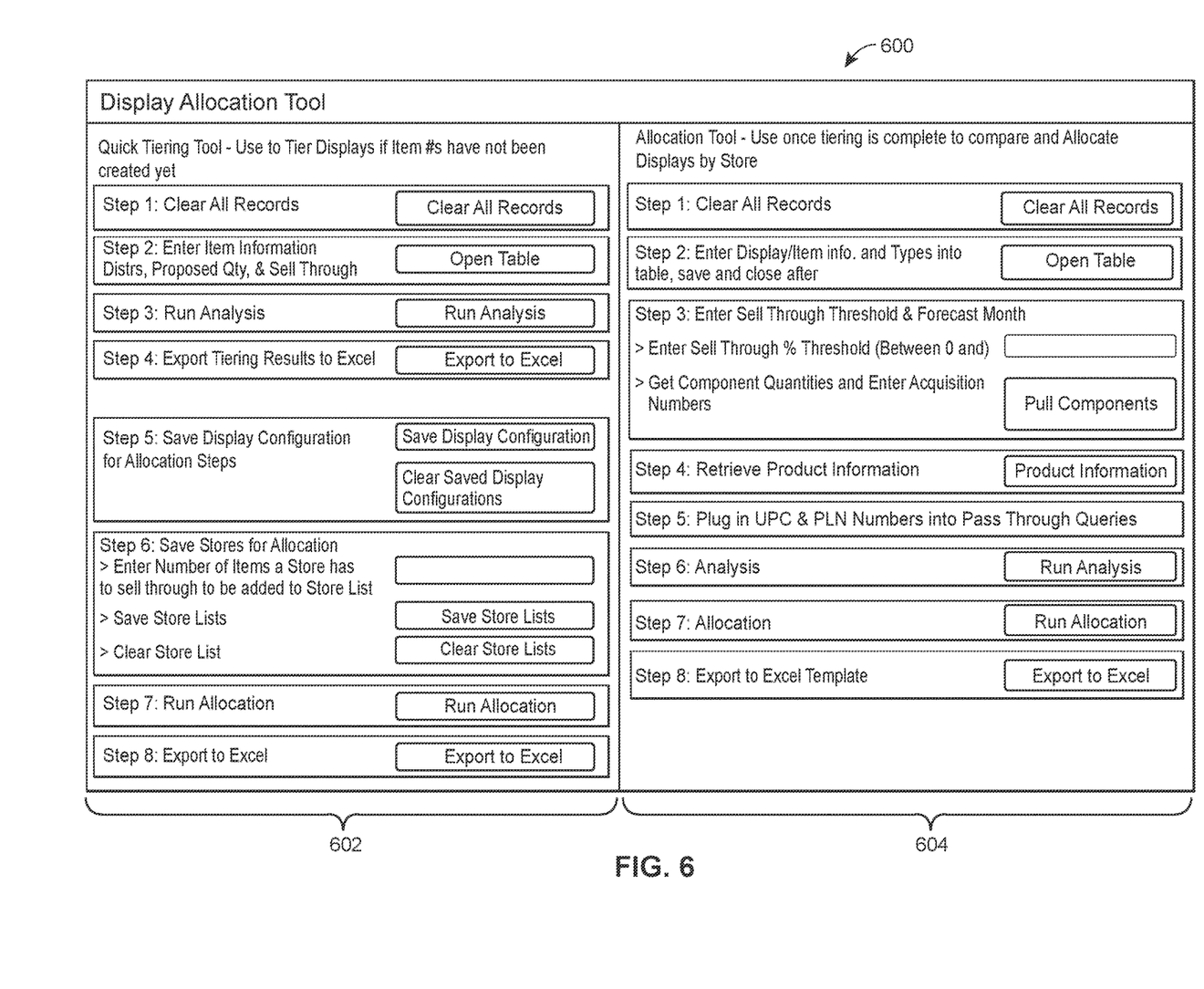
FIG. 6 illustrates an example user interface, which user interface may allow a user to initiate an allocation of displays.

In some implementations, a user of the display allocation engine 10 (e.g., a human user) may prompt an allocation of displays and the input of the data 11-18 to the display allocation engine 10 via a user interface. FIG. 6 illustrates an example user interface 600, which interface 600 may allow a user initiate a generation of inputs for a display allocation engine and/or initiate the allocation of displays to stores. The user interface 600 may include multiple sections 602 and 604. The sections 602 and 604 may include buttons, fields for the entry of text (e.g., text boxes), drop down menus, or any other suitable elements of user interfaces to allow a user to initiate a generation of inputs for a display allocation engine and/or initiate the allocation of displays to stores. The user may interact with the user interface 600 via the same or a different (e.g., remote) computing device as the computing device specially configured by the display allocation engine 10. An example computing device is further discussed with reference to FIG. 9.

The example section 602 of the user interface may allow a user to enter certain types of data (e.g., by "browsing" within a file directly of a computing device) and/or initiate the generation of certain types of data. A user may, in certain scenarios, interact with the section 602 to cause a forecast engine, such as the forecast engine 30, to generate forecasted quantities and/or rankings of displays. The example section 604 may further allow the user to enter other and/or additional types of data (e.g., thresholds) and initiate an allocation of displays to stores, via an display allocation engine, such as the display allocation engine 10.

After interacting with the example user interface 600 or another suitable interface, a display allocation engine, such as the display allocation engine 10, may allocate displays to stores. FIGS. 7A, 7B, 7C, and 7D illustrate example allocation solutions that may be output from an allocation of displays. For example, the allocation solutions illustrated in FIGS. 7A, 7B, 7C, and 7D may be the allocation solutions 20, in an example scenario. The allocation solutions illustrated in FIGS. 7A, 7B, 7C, and 7D may be output to a user interface of a remote computing device (e.g., operated by a user) and/or persistently saved to a data storage device via a data storage and communication mechanism.

Figure 7A:
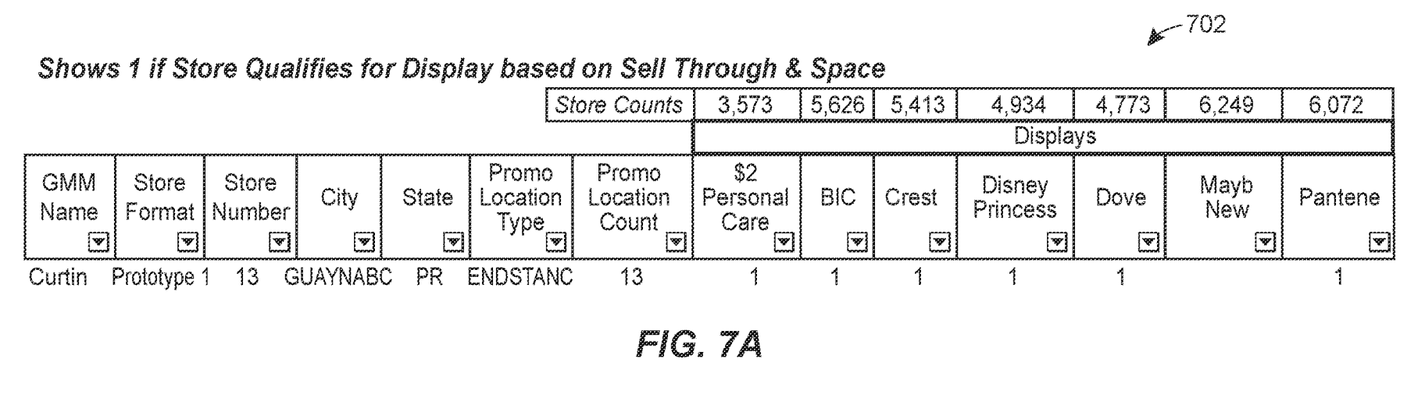
FIGS. 7A, 7B, 7C, and 7D illustrate example indications of display allocations, which indications may be output from a display allocation engine.
Figure 7B:
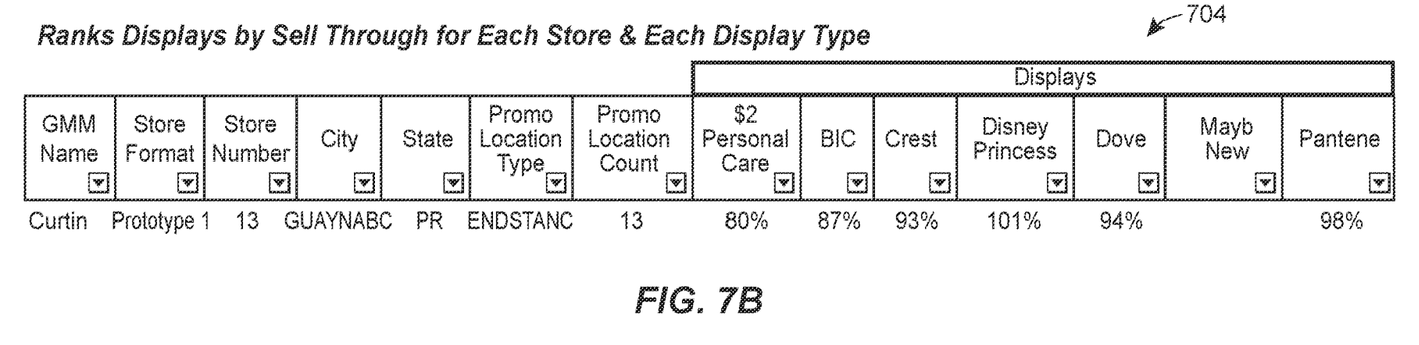

More specifically, FIG. 7A illustrates an example output 702 of an allocation of displays arranged or organized by store and sell through. The example display allocation engine 10 may output allocations of displays in a similar format to the output 702, in some implementations. In other implementations, the display allocation engine 10 may output allocation solution in the format of the example output 704 illustrated in FIG. 7B, where the example output 704 is arranged or organized by store and margin. By viewing the example outputs 702 and 704, a user may efficiently understand which displays are forecasted to perform best (e.g., in terms of sell through and/or margin) for each store and/or have been allocated to each store, for example.

Figure 7C:
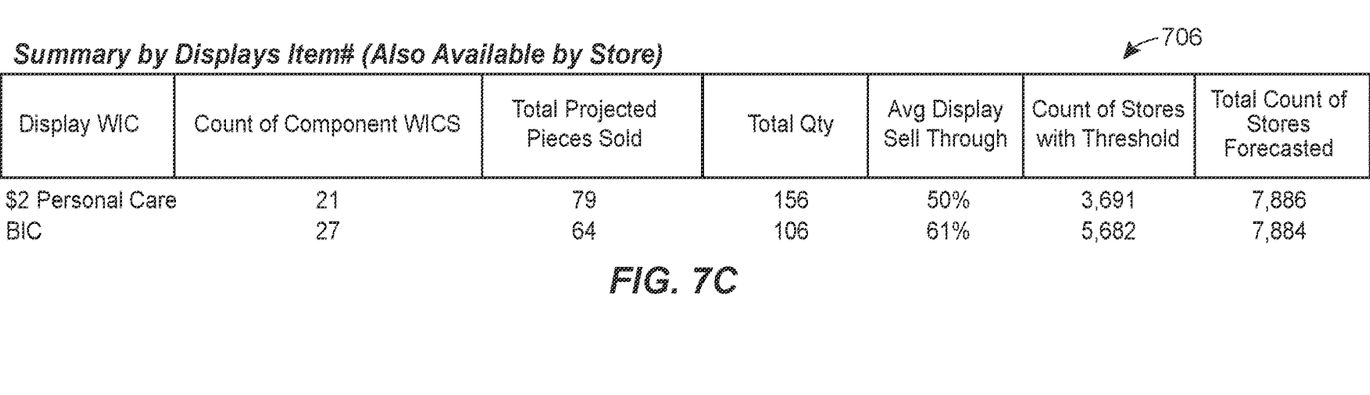
Figure 7D:
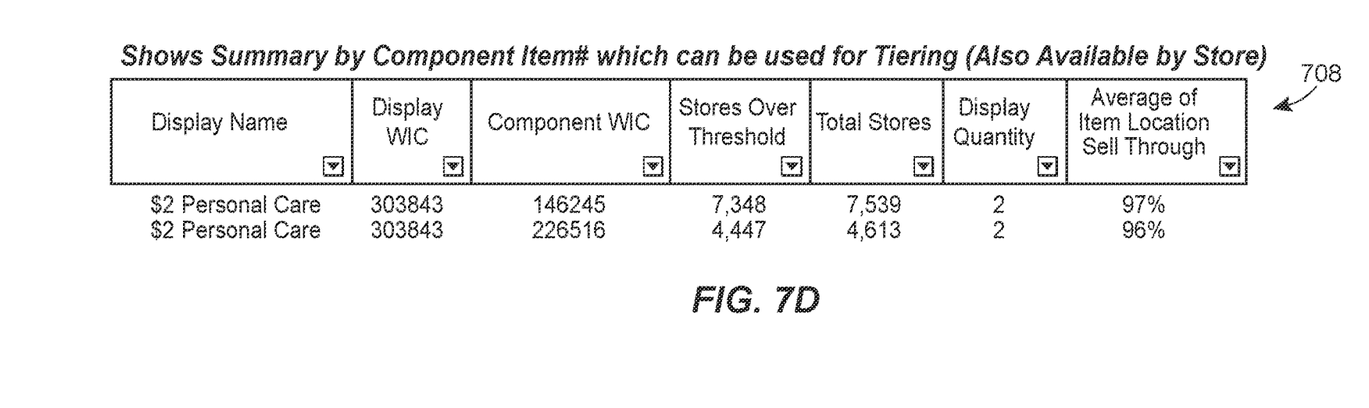

FIGS. 7C and 7D illustrates other example outputs 706 and 708, respectively. The example display allocation engine 10 may output allocations of displays in a format similar to the outputs 706 and/or 708 along with or instead of outputs in a format similar to the outputs 702 and 704. In some implementations, a user may selectively configure a display allocation engine to output a desired combination of the outputs 702, 704, 706, and 708 (e.g., via the user interface 600). The outputs 706 and 708 may be arranged or organized by display and item rather than by store, such that a user may easily ascertain the performance of individual displays and/or items for all stores. In particular, the outputs 706 and 708 may display counts, sell throughs, margins, profits, etc. for each display and/or for each item (e.g., product housed in a display) allocated to a plurality of stores.

Although FIGS. 7A, 7B, 7C, and 7D illustrate outputs for a certain number of stores, displays, and items, display allocation engines may output information about allocations and forecasts for any suitable number of stores, displays, and items. For example, a display allocation engine may output information about allocated displays, sell throughs, and margins for all stores to which display are allocated or for a suitable subset of stores. Further, although certain quantities (arranged in columns) are illustrated in the example outputs 702, 704, 706, and 708, display allocation engines may output any suitable number of quantities, metrics, forecasted numbers, etc. for each store, display, or item corresponding to a plurality of allocated displays.

Figure 8:
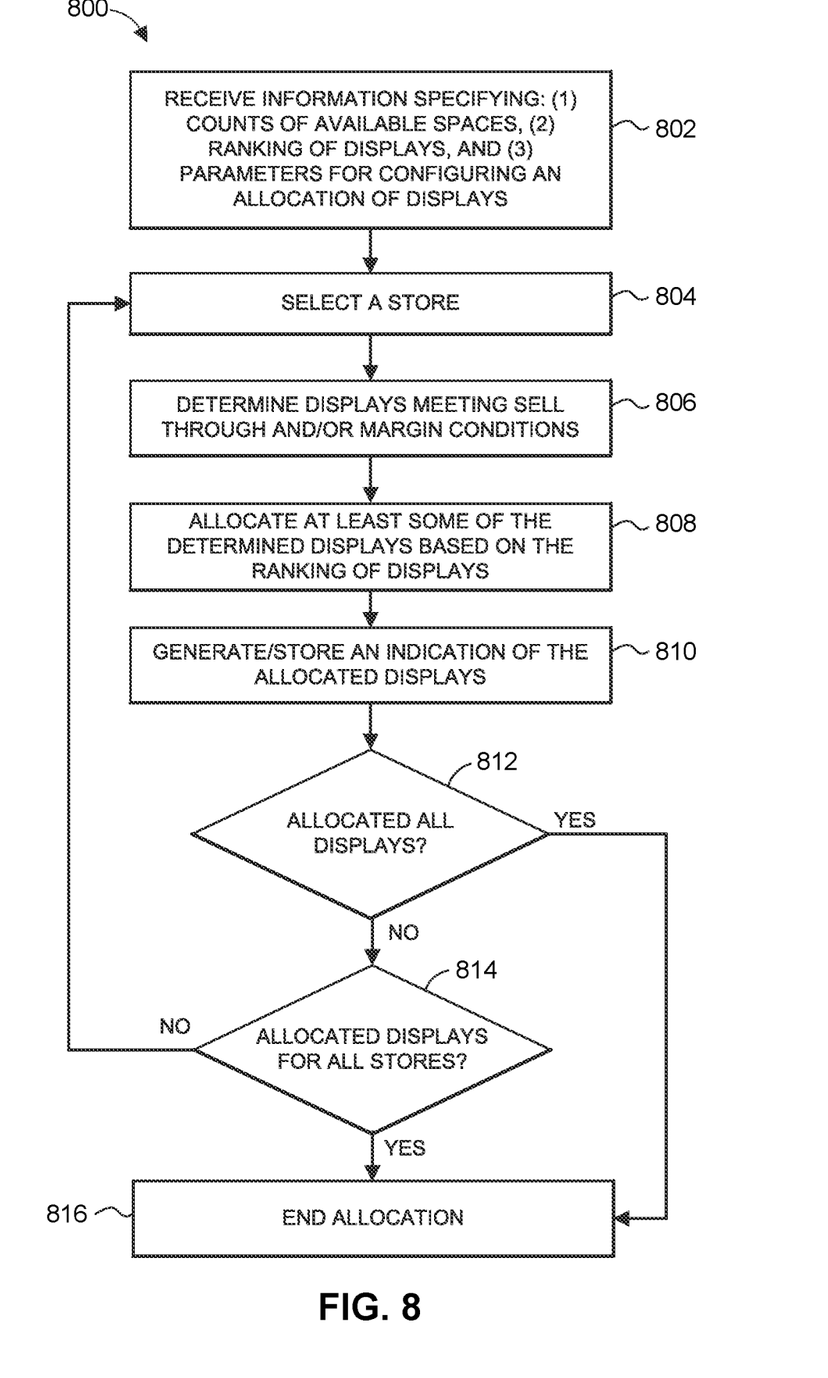
FIG. 8 is a flow diagram of an example method for allocating displays to a plurality of stores.

FIG. 8 is a flow diagram of an example method 800 for allocating displays to a plurality of stores. The method 800 may be implemented by an specially configured computing device, for example, as further discussed with reference to FIG. 9. Specifically, the method 800 may be implemented by the example display allocation engine 10 specially configuring a computing device to allocate displays to a plurality of stores.

In the method 800, information is received, where the information indicates counts of available spaces, rankings of displays, and parameters for configuring an allocation of displays (block 802). As discussed further with reference to FIG. 1, the display allocation engine 10 may receive a variety of data 11-18 from data storage device and/or from a forecast engine 30. This data 11-18 may indicate, among other things: (i) numbers (or counts) representing available spaces within each of a plurality of stores for each of a plurality of display types; (ii) rankings of displays for each store or for each store configuration if store are categorized into groups; and (iii) parameters, such as thresholds, that define one or more conditions utilized by the display allocation engine 10 to allocate displays.

Next, a certain store or store configuration is selected for the allocation of displays (block 804). In some implementations, the display allocation engine 10 may select stores in a pre-defined or otherwise determined order for the allocation of displays. That is, the display allocation engine 10 may allocate displays to certain stores before other stores based on an ordering of stores or store configurations. For example, the display allocation engine 10 may utilize the forecasted sell throughs 15 or forecasted margins 16 to dynamically determine an ordering of stores based on sell through or margin (e.g., the most "profitable" stores), and the display allocation engine 10 may allocate displays to the best stores first as measured by sell through or margin. In another examples, the display allocation engine 10 may allocate displays to stores in an order based on geographic locations of stores, store configurations or layouts, sizes of stores, etc. However, in some implementations, the display allocation engine 10 may near randomly or merely sequentially allocate displays to stores.

For the selected store, displays meeting one or more conditions are identified or determined (block 806). The one or more conditions may be defined by parameters that are input into the display allocation engine 10, such as the thresholds 17, and the determination or identification of the displays may utilize the thresholds 17 along with forecasted and/or other quantities to identify the displays. For example, the display allocation engine 10 may identify a subset of the total set of available displays, where the subset of displays has a corresponding forecasted sell through or margin above a threshold (e.g., one of the thresholds 17). Generally, the conditions utilized by the display allocation engine 10 may be conditions related to individual displays, conditions related to display types, conditions related to individual items, conditions related to combinations of items, conditions related to store configurations, or other suitable conditions.

In some implementations, the display allocation engine 10 may not identify any of the available display meeting the conditions specified by the thresholds 17 for one or more stores. In these cases, the display allocation engine 10 may not allocate display to the store. Generally, the display allocation engine 10 may allocate display to all stores or only certain stores based on the one or more conditions. Further, the display allocation engine 10 may only allocate some of the available display for allocation, if only some of the available displays meet the one or more conditions utilized to allocate displays.

Returning to FIG. 8, at least some of the identified or determined subset of displays is allocated to the selected store based on the received rankings of displays (block 808). The display allocation engine 10 may assign each of the identified subset of displays to the selected store in an order defined by the received rankings of displays until all of the available spaces within the selected store are filled, in an implementation. In other implementations, the display allocation engine 10 may iteratively assign displays to stores. That is, the display allocation engine 10 may only assign one or another pre-defined number of available displays to each store in an iteration and continue to iterate over stores until all displays are allocated or until all spaces are filled. In any event, the display allocation engine 10 may assign or allocate displays in identified subsets of displays to stores based on the received rankings of displays.

Once at least some of the displays have been allocated to the selected store, an indication of the allocated displays is stored and/or communicated (block 810). In some implementations, the display allocation engine 10 may store the indication in a non-transitory memory of a computing device, or the display allocation engine 10 may persistently store the indication, via a data storage mechanism, on a separate data storage device (e.g., an disk or solid state drive). Additionally or alternatively, the display allocation engine 10 may communicate, via one or more network interfaces, the indication to one or more remote computing devices. For example, the display allocation engine 10 may cause the indication to be displays on a display device of a remote computing device via a network connection (e.g., the Internet or a local area network).

After allocating displays for the selected store, it is determined if all available displays have been allocated (block 812). The display allocation engine 10 may keep a running total count of displays that have been allocated and displays that have not been allocated. If all displays have been allocated (e.g., assigned to a store), the flow of method 800 may continue to block 816, where the method ends. If displays are still available for allocation, the flow may continue to block 814. At block 814, it is determined if displays have been allocated for all stores. If displays have not been allocated for all stores, the flow may revert to block 804, where a new store is selected for the allocation of displays. If displays meeting the one or more conditions have been allocated to all stores, the flow may continue to block 816, where the method ends.

Figure 9:
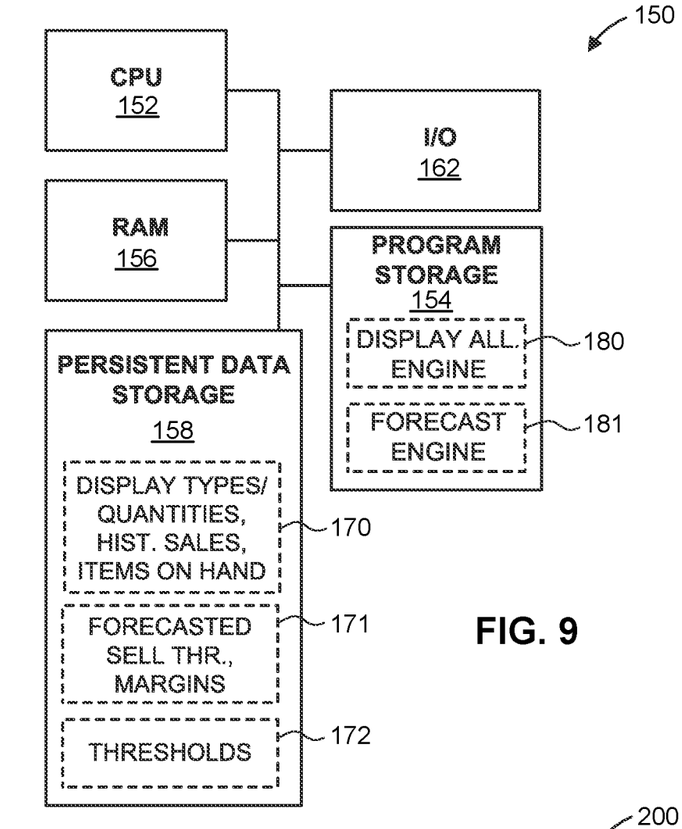
FIG. 9 is a block diagram of an example computing device which can be specially configured by a display allocation engine.

Examples of a specially configured computing device and a computing network in which a display allocation engine can be implemented are discussed with reference to FIGS. 9 and 10, respectively. Referring first to FIG. 9, a specially configured computing device 150 includes one or more processors, depicted as a central processing unit (CPU) 152. The CPU 152 is particularly configured to operate by software instructions stored in a program storage 154, which may be any type of a suitable computer-readable medium. The program storage 154 may be, for example, a tangible non-transitory medium such as a hard disk or flash memory. In some implementations, the program storage 154 is implemented in a random access memory (RAM) module 156, a persistent data storage 158, or both. In addition to programs, the modules 156 and 158 may store data in a volatile or non-volatile mode, respectively. For example, data 170 may include data indicative of display types/quantities, historical sales data, and numbers of items on hand at stores. Data 171 may indicate forecasted sell throughs, forecasted margins, and rankings of displays, and data 172 may indicate thresholds and/or other parameters defining conditions utilized by a display allocation engine. This data 170, 171, and 172 may be similar to the data 11-18 illustrated in FIG. 1. During operation, the particularly or specially configured CPU 152 may load some or all of the data 170, 171, and 172 into the RAM module 156.

The computing device 150 also may include an input/output (I/O) subsystem 162 having one or several input devices to receive user input and one or more output devices to provide allocation solutions. Moreover, the computing device 150 may include additional modules, such as hardware components for wired or wireless communications (not shown). In general, the computing device 150 may be any suitable portable or non-portable computing device that is particularly configured to implement the specialized methods or techniques discussed herein, and accordingly may include various additional components in various implementations.

A display allocation engine 180 residing in the program storage 154 may operate on the data stored in the persistent data storage 158 and the RAM 156, for example, or received via the I/O module 162. The display allocation engine 180 may be a specialized module, routine, engine, etc. operating in a similar manner to the display allocation engine 10 discussed above. In some embodiments, a forecast engine 181 may also reside in the program storage 154. The forecast engine 181, when executed by the processors 152 may produce at least some of the input (e.g., forecasted sell throughs or margins) for the display allocation engine 180 (e.g., allocation solutions). That is, the forecast engine 181 may specially configure the computing device 150 such that the computing device 150 is able to operate on historical sales data, or other suitable data, to produce forecasted quantities, which forecasted quantities are utilized by the display allocation engine 180 in allocating displays to stores.

Thus, the display allocation engine 180 and/or the forecast engine 181 configure the computing device 150 to perform specialized functions, such as automatically generating allocation solutions for a retail space and automatically forecasting quantities utilized in generating the allocations solutions. The computing device 150 may generate, filter, and present allocation solutions more efficiently (e.g., in fewer processor cycles, with less memory utilization, with fewer costly transfers of data, or in less time) than operators or general purpose computers operating to manually or sequentially examine all possible combinations of available displays allocated to a plurality of retail spaces.

Figure 10:
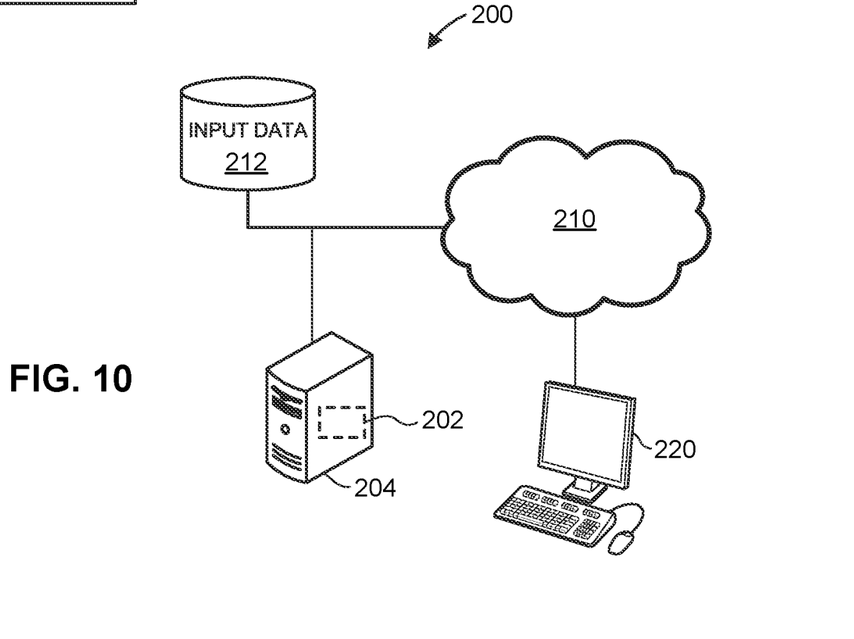
FIG. 10 illustrates an example network environment in which the computing device of FIG. 9 can be implemented.

In some embodiments, a display allocation engine similar to the display allocation engine 10 or 150 operates in a network environment, such as in a communication network 200 illustrated in FIG. 10. In these embodiments, a display allocation engine 202 operates in a network server 204 connected to a network 210, to which an input database 212 (e.g., stored on one or more data storage units such as optical drives, solid state hard drives, tapes, etc.) also may be coupled. The input database 212 may store data similar to the data 11-18, as described further with reference to FIG. 1. The network 210 may be a local area network (LAN) or a wide area network (WAN), for example. In some implementations, the display allocation engine 202 may be distributed among multiple servers. A workstation 220, via which a user may interact with the display allocation engine 202, may be coupled to the server 204 via the network 210 and may access the database 212 via one or more data access mechanisms. The data access mechanisms utilized to access the database 212 may include, by way of example, a combination of physical links (e.g., cables), ports, jacks, etc. along with a combination of specially configured instructions, such as particularly configured database query programs, stored on the workstation 220.

What is claimed is:

1. A method for optimizing an allocation of a plurality of available display structures of a plurality of display structure categories among a plurality of stores grouped into a plurality of store configurations, the method comprising:
   assigning, by a display allocation module stored on one or more memories of at least one computing device, a first one or more available display structures of the plurality of available display structures to a first store of the plurality of stores, the assigning based on:
   (i) a determination, for each category of one or more display structure categories of the plurality of display structure categories, that the first one or more available display structures meet one or more conditions corresponding to the first store during a period of time in the future when the plurality of available display structures is to be allocated among the plurality of stores, and
   (ii) a plurality of counts, each count of the plurality of counts indicative of a respective number of spaces available in a store configuration of the first store for the each category of the one or more display structure categories;
   updating, based on the assigning of the first one or more available display structures, the plurality of available display structures to exclude the first one or more available display structures assigned to the first store;
   assigning, by the display allocation module to a second store included in the plurality of stores and based on a store configuration of the second store, a second one or more available display structures of the updated plurality of available display structures; and
   updating, based on the assigning of the second one or more available display structures, the updated plurality of available display structures to exclude the second one or more available display structures assigned to the second store.

2. The method of claim 1, wherein the assigning of the first one or more available display structures to the first store is further based on a ranking of available display structures meeting the one or more conditions, the ranking based on respective benefits of the available display structures meeting the one or more conditions for the store configuration of the first store.

3. The method of claim 2, further comprising determining the ranking of the available display structures meeting the one or more conditions.

4. The method of claim 2, wherein the respective benefits for the store configuration of the first store are based on at least one of: respective historical sales data, respective models of sales, respective forecasted margins, or respective forecasted sellthroughs corresponding to each available display structure meeting the one or more conditions.

5. The method of claim 1, wherein the determination that the first one or more available display structures meet the one or more conditions corresponding to the first store is based on one or more of: a threshold corresponding to a maximum number of display structures for a geographic area, a respective threshold corresponding to a number of display structures that are to be distributed to a respective store, or a respective threshold corresponding to a timing of display structure allocation to a respective store.

6. The method of claim 1, wherein the assigning of the first one or more available display structures to the first store includes determining that at least some of the plurality of available display structures meet the one or more conditions corresponding to the first store during the period of time in the future.

7. The method of claim 6,
   further comprising ordering the plurality of stores based on at least one of respective forecasted sell throughs or respective forecasted margins of the plurality of stores during the period of time in the future, and filtering the ordered plurality of stores based on values of the at least one of the respective forecasted sell throughs or the respective forecasted margins; and
   wherein the determination that the at least some of the plurality of available display structures meet the one or more conditions corresponding to the first store during the period of time in the future is based on the filtering.

8. The method of claim 7, wherein the ordering of the plurality of stores is further based on at least one of respective geographic locations of the plurality of stores, respective store configurations of the plurality of stores, or respective sizes of the plurality of stores.

9. The method of claim 1, wherein:
the one or more display structure categories is a first one or more display structure categories,
the one or more conditions is a first one or more conditions, and
the assigning of the second one or more available display structures of the updated plurality of available display structures to the second store is further based on a determination, for each category of a second one or more display structure categories of the plurality of display structure categories, that the second one or more available display structures of the updated plurality of available display structures meet a second one or more conditions corresponding to the second store.

10. A system, comprising:
one or more processors;
one or more non-transitory memories; and
computer-executable instructions that are stored on the one or more non-transitory memories, that specially configure the system, and that, when executed by the one or more processors, cause the system to:
assign a first one or more available display structures of the plurality of available display structures to a first store of the plurality of stores, the assignment based on:
(i) a determination, for each category of one or more display structure categories of the plurality of display structure categories, that the first one or more available display structures meet one or more conditions corresponding to the first store during a period of time in the future when the plurality of available display structures is to be allocated among the plurality of stores, and
(ii) a plurality of counts, each count of the plurality of counts indicative of a respective number of spaces available in a store configuration of the first store for the each category of the one or more display structure categories;
update, based on the assignment of the first one or more available display structures, the plurality of available display structures to exclude the first one or more available display structures assigned to the first store;
assign, to a second store included in the plurality of stores and based on a store configuration of the second store, a second one or more available display structures of the updated plurality of available display structures; and
update, based on the assignment of the second one or more available display structures, the updated plurality of available display structures to exclude the second one or more available display structures assigned to the second store.

11. The system of claim 10, wherein the assignment of the first one of more available display structures to the first store is further based on a ranking of available display structures meeting the one or more conditions, the ranking based on respective benefits of the available display structures meeting the one or more conditions for the store configuration of the first store.

12. The system of claim 11, wherein the computer-executable instructions are further executable to cause the system to determine the ranking of the available display structures meeting the one or more conditions.

13. The system of claim 11, wherein the respective benefits of the available display structures meeting the one or more conditions are based on at least one of respective historical sales data, respective models of sales, respective forecasted margins, or respective forecasted sellthroughs corresponding to each available display structure meeting the one or more conditions.

14. The system of claim 13, wherein at least one of: the respective forecasted margins include a respective per-item forecasted margin, or the respective forecasted sellthroughs include a respective per-item sell through.

15. The system of claim 13, wherein the respective benefits of the available display structures meeting the one or more conditions are based on machine learning applied to at least one of the respective historical sales data or the respective models of sales.

16. The system of claim 10, wherein:
an ordering of the plurality of stores is based on at least one of respective forecasted sell throughs or respective forecasted margins of the plurality of stores during the period of time in the future;
the ordered plurality of stores is filtered based on values of the at least one of the respective forecasted sell throughs or the respective forecasted margins; and
the determination that the first one or more available display structures meet the one or more conditions is based on the filtered, ordered plurality of stores.

17. The system of claim 16, wherein the ordering of the plurality of stores is further based on at least one of respective geographic locations of the plurality of stores, respective store configurations of the plurality of stores, or respective sizes of the plurality of stores.

18. The system of claim 10, wherein the one or more conditions include at least one of a margin threshold or a sell through threshold related to display structures.

19. The system of claim 10, wherein the one or more conditions include at least one of: a threshold corresponding to a maximum number of display structures for a geographic area in which the first store is located, a threshold corresponding to a number of display structures that are to be distributed to the first store, or a threshold corresponding to a timing of display structure allocation to the first store.

20. The system of claim 10, wherein:
the one or more display structure categories is a first one or more display structure categories,
the one or more conditions is a first one or more conditions, and
assignment of the second one or more available display structures of the updated plurality of available display structures to the second store is further based on a determination, for each category of a second one or more display structure categories of the plurality of display structure categories, that the second one or more available display structures of the updated plurality of available display structures meet a second one or more conditions corresponding to the second store.

* * * * *